(12) United States Patent
Horiuchi

(10) Patent No.: US 6,962,088 B2
(45) Date of Patent: Nov. 8, 2005

(54) TORQUE DETECTION DEVICE FOR WAVE GEARING

(75) Inventor: Masashi Horiuchi, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/661,586

(22) Filed: Sep. 15, 2003

(65) Prior Publication Data

US 2004/0079174 A1  Apr. 29, 2004

(30) Foreign Application Priority Data

Sep. 17, 2002 (JP) .............................. 2002-269505
Dec. 6, 2002 (JP) .............................. 2002-354662

(51) Int. Cl.$^7$ .............................................. G01L 1/22
(52) U.S. Cl. .............................................. 73/862.338
(58) Field of Search ................... 73/862.338, 862.474, 73/862.627, 862.628, 760, 763, 769, 774

(56) References Cited

U.S. PATENT DOCUMENTS

| | | | | |
|---|---|---|---|---|
| 3,772,628 A | * | 11/1973 | Underwood et al. ........... 73/726 |
| 4,089,216 A | * | 5/1978 | Elias ........................ 73/862.31 |
| 4,776,414 A | * | 10/1988 | Badcock ................ 73/862.632 |
| 4,993,267 A | * | 2/1991 | Allard et al. .................. 73/726 |
| 5,065,631 A | * | 11/1991 | Ashpitel et al. ............... 73/849 |
| 5,172,774 A | * | 12/1992 | Melrose ....................... 173/182 |
| 5,313,828 A | * | 5/1994 | Kotzle et al. ............ 73/862.44 |
| 5,386,724 A | * | 2/1995 | Das et al. ................. 73/152.59 |
| 5,548,092 A | * | 8/1996 | Shriver ..................... 178/19.01 |
| 6,000,289 A | * | 12/1999 | Horiuchi et al. ........ 73/862.325 |
| 6,170,340 B1 | * | 1/2001 | Horiuchi et al. ........ 73/862.321 |
| 6,269,702 B1 | * | 8/2001 | Lambson ................ 73/862.045 |
| 6,427,307 B1 | * | 8/2002 | Al-Rawi ................ 73/862.322 |
| 2004/0159161 A1 | * | 8/2004 | Barnett ........................ 73/766 |

FOREIGN PATENT DOCUMENTS

| JP | 09-184777 | 7/1997 |
|---|---|---|
| JP | 2000-131160 | 5/2000 |

* cited by examiner

Primary Examiner—Edward Lefkowitz
Assistant Examiner—Takisha Miller
(74) Attorney, Agent, or Firm—Burns, Doane, Swecker & Mathis, L.L.P.

(57) ABSTRACT

The torque detection device for a wave gearing comprises a strain gauge unit having a strain gauge pattern. The strain gauge pattern includes circular-arc shaped detection segments A and B, and three terminal portions for external wiring with one being formed between the detection segments and the others at opposite ends thereof. The strain gauge unit having the strain gauge pattern can be mounted on the diaphragm of a flexible external gear by a simple operation of positioning the strain gauge unit on the diaphragm and connecting the three terminal portions to the external wirings. Compared to the case where a large number of perpendicular biaxial strain gauges are positioned and wired to form a bridge circuit, the wiring operation can be simplified, the mounting space can be reduced, and errors in detected signals due to the positioning errors of the strain gauges can also be reduced.

2 Claims, 19 Drawing Sheets

Fig.2A
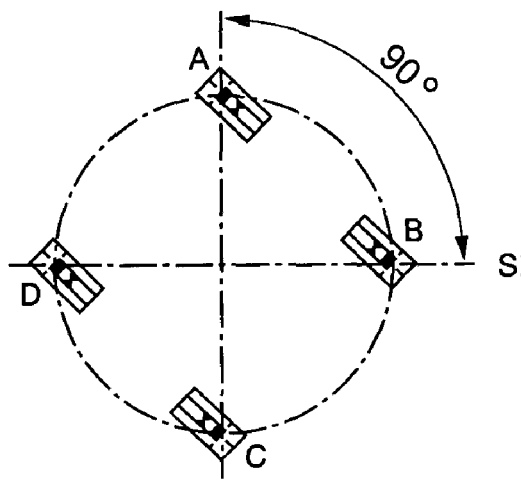
Fig.2B
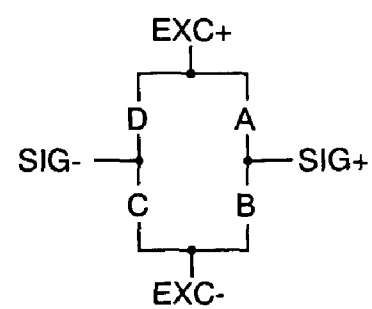
Fig.2C
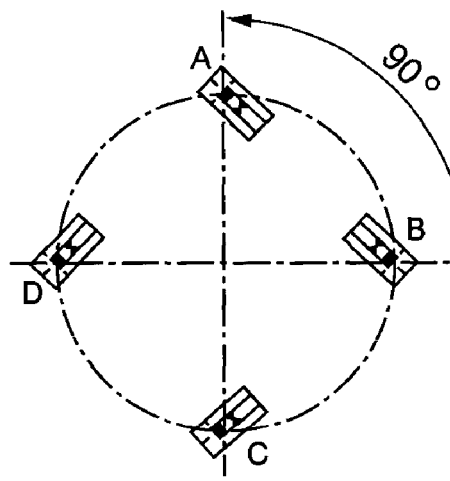
Fig.2D
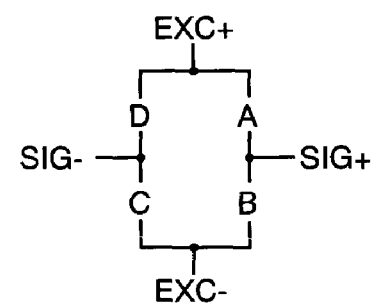
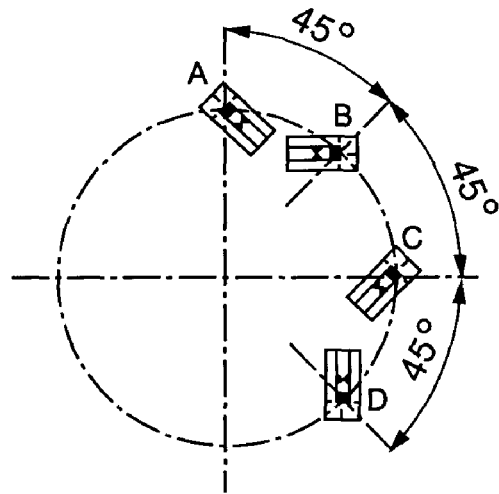
Fig.2E
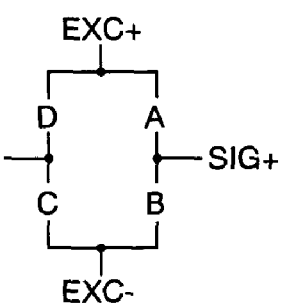
Fig.2F Fig.4A
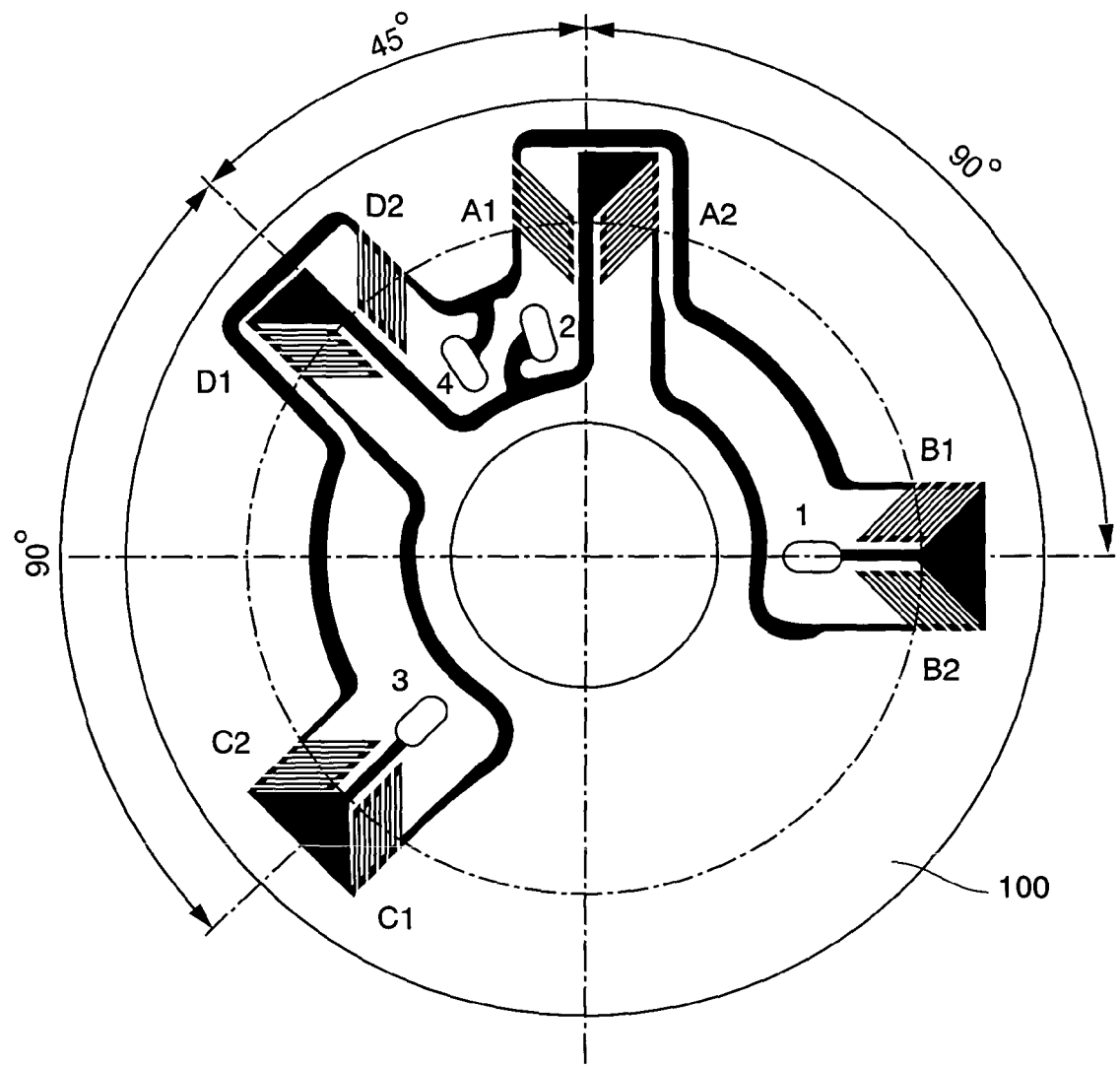
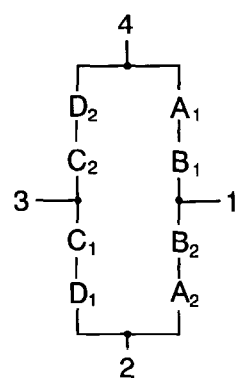
Fig.4B Fig.5A
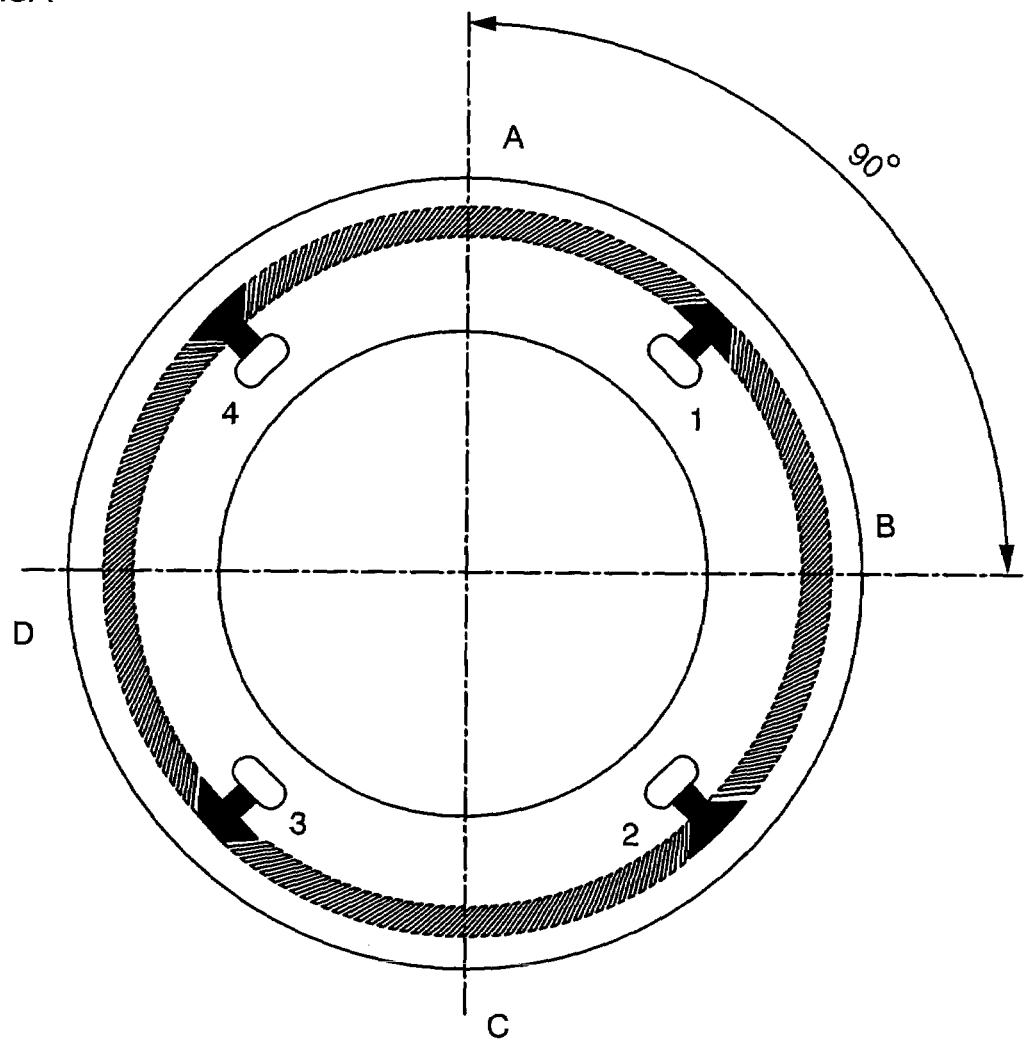
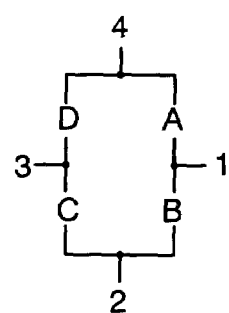
Fig.5B Fig.7A
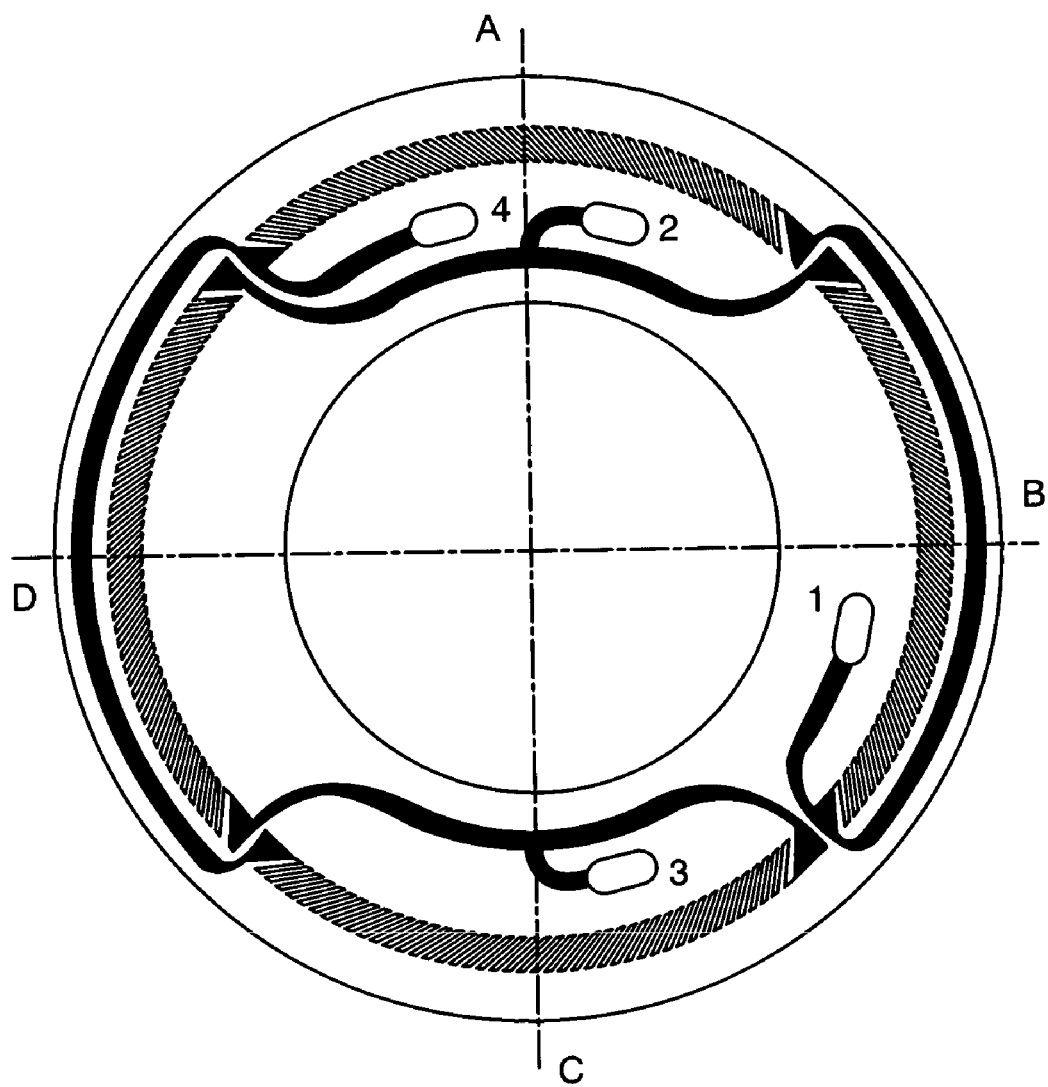
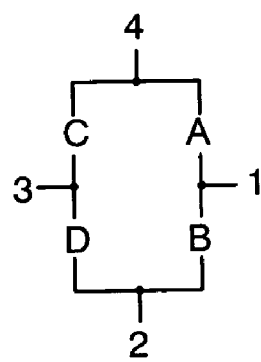
Fig.7B Fig.9A
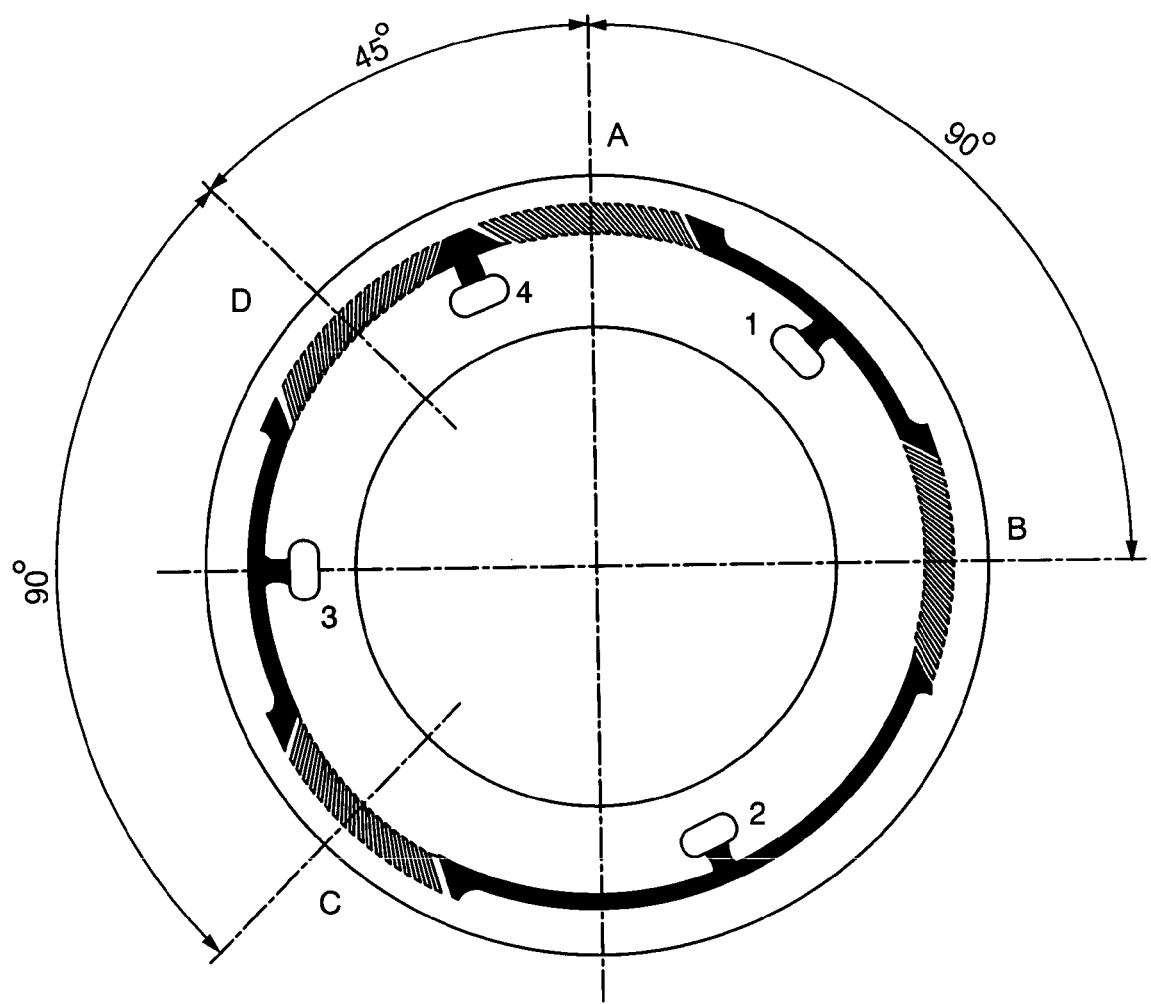
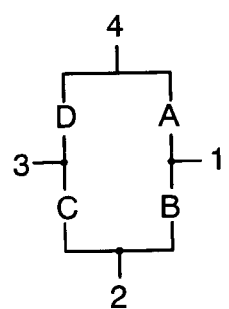
Fig.9B Fig.10A
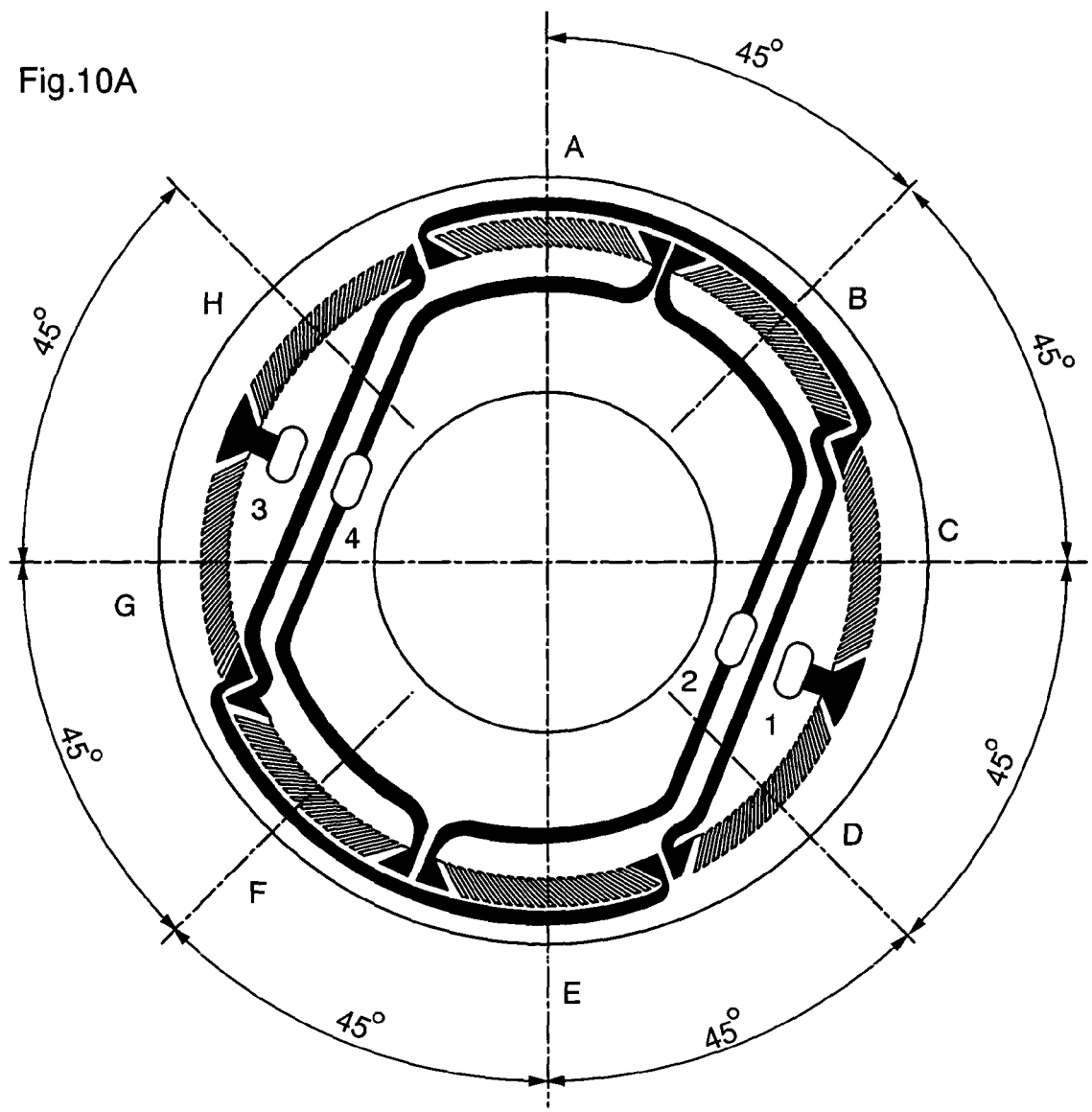
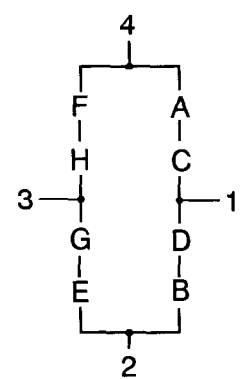
Fig.10B Fig.11A
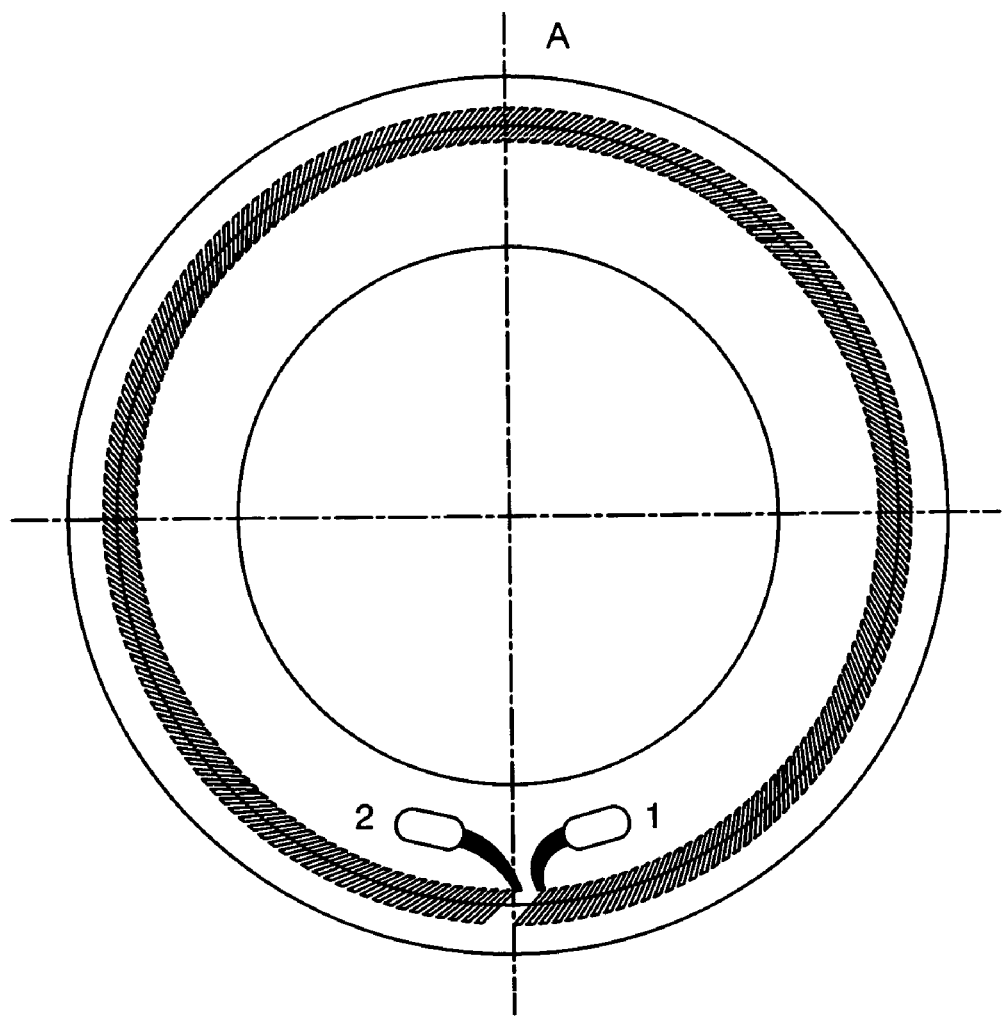
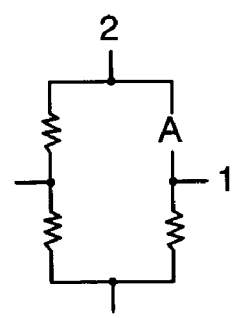
Fig.11B Fig.15B
Fig.15A
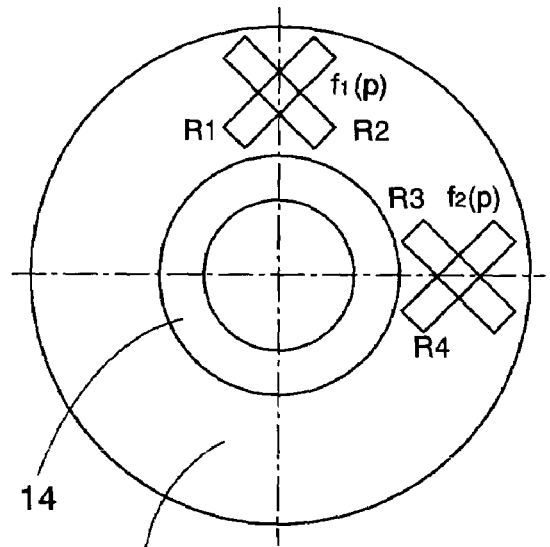
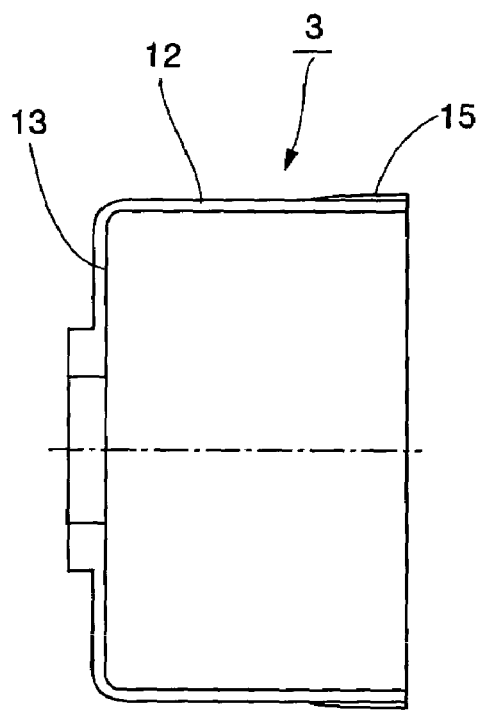
(Prior Art)

TORQUE DETECTION DEVICE FOR WAVE GEARING

CROSS-REFERENCE TO RELATED APPLICATIONS

This application claims priority under 35 U.S.C. §119 to JP 2002-269505 filed in Japan on Sep. 17, 2002, and JP 2002-354662 filed in Japan Dec. 6, 2002; the entire contents of which are hereby incorporated by reference.

BACKGROUND OF THE INVENTION

1. Field of the Invention

The present invention relates to a torque detection device for a wave gearing. More specifically, the present invention relates to a torque detection device for the wave gearing that is capable of detecting transmitted torque with good precision with the aid of strain gauges attached on a flexible external gear, using the elastic deformation of the flexible external gear of the wave gearing.

2. Description of the Related Art

A wave gearing 1 comprises a rigid internal gear 2, a flexible external gear 3 disposed therein, and a wave generator 4 that flexes this flexible external gear 3 in the radial direction to partially engage the rigid internal gear 2 and moves the engaging positions in the circumferential direction, as shown in FIGS. 1A and 1B. Typically, the flexible external gear 3 is elliptically flexed by the elliptically contoured wave generator 4. When the wave generator 4 is rotated by a motor or other means, relative rotation is generated between the gears 3 and 4 due to the difference in number of teeth between these gears. The rigid internal gear 2 is commonly fixed, the flexible external gear 3 is used as an output element, and an output of reduced rotational speed is obtained from the external gear 3.

There have been known methods making use of the elastic deformation of the flexible external gear 3 in order to detect the output shaft torque of the wave gearing 1, namely, the torque transmitted through the flexible external gear 3. As shown in FIGS. 15A and 15B, the generally used, cup-shaped flexible external gear 3 comprises a flexible cylindrical body portion 12, a disk-shaped diaphragm 13 formed integrally at one end thereof, a boss 14 formed integrally on the center portion of the diaphragm 13, and external teeth 15 formed on the external circumference portion of the open end of the cylindrical body portion 12. Strain gauges are adhered on the diaphragm 13 or on the external circumferential surface of the cylindrical body portion 12, whereby the output shaft torque can be detected based on the outputs thereof.

Since the flexible external gear 3 is elliptically flexed by the wave generator 4, each portion of the flexible external gear 3 is repeatedly and forcedly deformed in the radial direction as the wave generator rotates. Thus, strain unrelated to the transmitted torque is generated in the flexible external gear 3. Each portion of the flexible external gear 3 reciprocates twice with a fixed amplitude in the radial direction with each rotation of the wave generator. Strain unrelated to the transmitted torque is therefore sinusoidal strain in which two periods per one rotation of the wave generator constitute the fundamental period (one period: 180°).

Conventionally, a perpendicular biaxial strain gauge f1(p) (R1, R2) and a similar perpendicular biaxial strain gauge f2(p) (R3, R4) are adhered on the surface of the cup-shaped flexible external gear 3, for example, the inner surface 13a of the diaphragm 13 in a matter mutually offset by 90°, as shown in FIG. 15B. The gauges are connected so as to constitute a Wheatstone bridge circuit, and the strain component of the fundamental period is cancelled based on the output of both strain gauges. However, the linearity of the detection output is inadequate with this method, and rotational ripple components that have short periods (a multiple of the fundamental period) remain in the detection output. The principal cause of rotational ripple is thought to be an asymmetry in the elliptical deformation of the flexible external gear.

To cancel the strain of the secondary component (period: 90°), efforts have been made to mutually offset by 45° four perpendicular biaxial strain gauges that are offset by 90° in relation to each other, for a total of eight strain gauges. To further improve the linearity of the detection output, a configuration has also been proposed whereby perpendicular biaxial strain gauges are symmetrically disposed within a range of 360°, and these are mutually wired to form a Wheatstone bridge. Examples of the mounting positions of the perpendicular biaxial strain gauges and configuration examples of Wheatstone bridge circuits are shown in FIGS. 16 to 19.

Torque detection devices for wave gearings that use strain gauges are disclosed, for example, in JP-A 9-184777 and JP-A 2000-131160 that were assigned to the same assignee of the present application.

However, the conventional torque detection devices for the wave gearings requires a large number of strain gauges that must be mounted on the flexible external gear. This causes to increase the manufacturing price of the strain gauge type detection device in comparison with a load cell or other detection devices.

In the case of a small-sized wave gearing, it is difficult to secure enough space for mounting a large number of perpendicular biaxial strain gauges. The wiring work for each strain gauge is also difficult.

SUMMARY OF THE INVENTION

An object of the present invention is to provide an inexpensive torque detection device having strain gauges that is capable of detecting transmitted torque with high accuracy.

Another object of the present invention is to provide a torque detection device having strain gauges that is capable of detecting transmitted torque with high accuracy, and that is easily incorporated into a small-sized wave gearing.

To achieve the above and other objects according to the present invention, there is provided a torque detection device for a wave gearing, which detects torque transmitted through a flexible external gear of a wave, comprising:

at least one strain gauge unit mounted on a surface of the flexible external gear, a bridge circuit constituted by the strain gauge unit, and a signal processing circuit for detecting the torque on the basis of output signals from the bridge circuit, wherein the strain gauge unit has a strain gauge pattern including at least one detection segment of resistance wire, and wherein the detection segment is formed so that it have a prescribed shape of a grid pattern including parallel portions of the resistance wire arranged at regular intervals.

Here, the detection segment may have a circular arc shape of 360°. Alternatively, the strain gauge pattern may include two detection segments having circular arc shapes of 180°. A configuration wherein the strain gauge pattern includes four successive detection segments having circular arc shapes of 90° is also possible. A configuration wherein the strain gauge pattern includes at least three detection segments having circular arc shapes of 45° is further possible.

Where the detection segment having a circular arc shape of 360°, a composite strain gauge unit may be employed, which has a first strain gauge unit formed with a first detection segment and a second strain gauge unit formed with a second detection segment. The first and second strain gauge units are superposed together so that the grid patterns thereof intersect perpendicularly with each other.

The wiring of the strain gauge unit may be simplified by using a strain gauge pattern that includes the detection segments and the wiring pattern for connecting the detection segments to each other so as to form the bridge circuit.

BRIEF DESCRIPTION OF THE DRAWINGS

FIGS. 2A and 2B are respectively a diagram showing an example of a strain gauge arrangement that corresponds to the arrangement example shown in FIGS. 16A and 16B and configured using uniaxial strain gauges, and a diagram showing the bridge circuit thereof; FIGS. 2C and 2D are respectively a diagram showing another example of a strain gauge arrangement that corresponds to the arrangement example shown in FIGS. 16A and 16B and configured using uniaxial strain gauges, and a diagram showing the bridge circuit thereof; and FIGS. 2E and 2F are respectively a diagram showing an example of a strain gauge arrangement that corresponds to the arrangement example shown in FIGS. 17A and 17B and configured using uniaxial strain gauges, and a diagram showing the bridge circuit thereof;

FIGS. 4A and 4B are respectively a diagram showing the strain gauge pattern according to the second embodiment of the present invention, and a diagram showing the bridge circuit thereof;

FIGS. 5A and 5B are respectively a diagram showing an example of the strain gauge pattern according to the third embodiment of the present invention, and a diagram showing the bridge circuit thereof;

FIGS. 7A and 7B are respectively a diagram showing an example of the strain gauge pattern according to the third embodiment of the present invention, and a diagram showing the bridge circuit thereof;

FIGS. 9A and 9B are respectively a diagram showing an example of the strain gauge pattern according to the third embodiment of the present invention, and a diagram showing the bridge circuit thereof;

FIGS. 10A and 10B are respectively a diagram showing an example of the strain gauge pattern according to the third embodiment of the present invention, and a diagram showing the bridge circuit thereof;

FIGS. 11A and 11B are respectively a diagram showing an example of the strain gauge pattern according to the fourth embodiment of the present invention, and a diagram showing the bridge circuit thereof;

FIG. 15A is a cross-sectional view showing a cup-shaped flexible external gear of a wave gearing, and FIG. 15B is a diagram showing perpendicular biaxial strain gauges mounted on the diaphragm thereof;

DESCRIPTION OF THE PREFERRED EMBODIMENTS

Figure 1A:
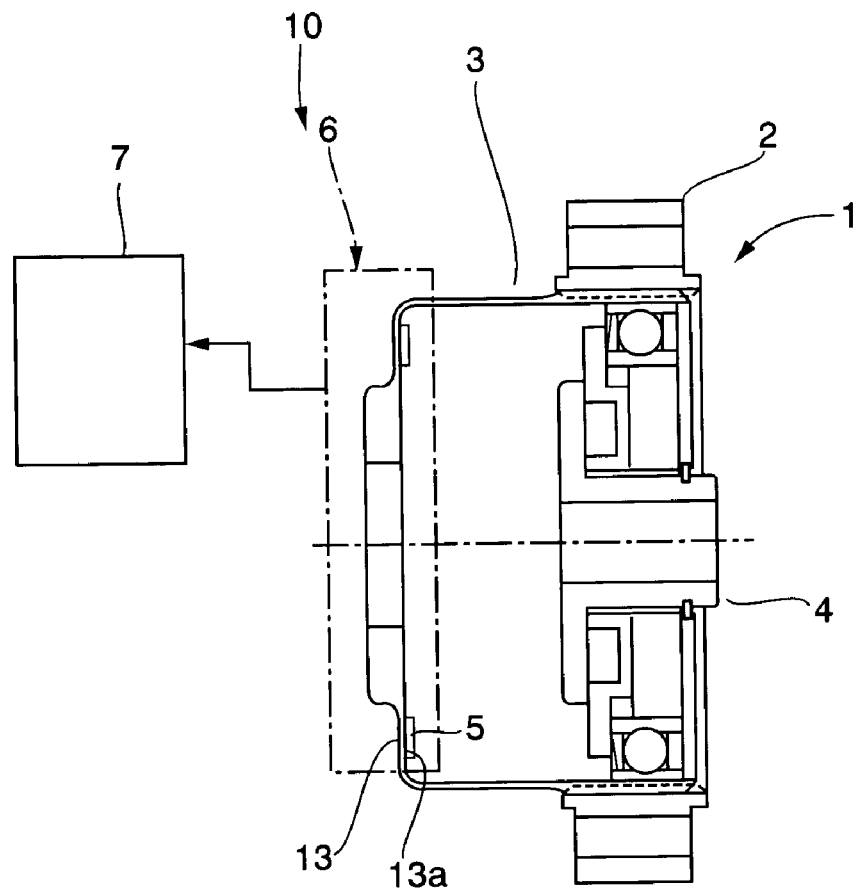
FIG. 1A is a general configuration diagram showing the torque detection device according to the present invention.
Figure 1B:
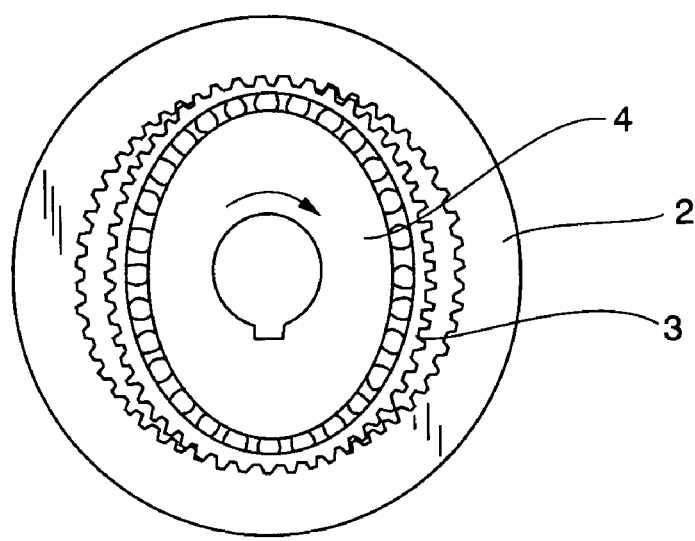
FIG. 1B is a diagram showing a configuration of a wave gearing.

A torque detection device for a wave gearing according to the present invention is described below with reference to the attached drawings. FIG. 1 is a general configuration diagram showing an example of a torque detection device of a wave gearing. A torque detection device 10 comprises a strain gauge unit 5 mounted on a wave gearing 1, a bridge circuit 6 constituted by the strain gauge unit 5, and a signal processing circuit 7 for detecting transmitted torque by processing output signals of the bridge circuit 6. The strain gauge unit 5 is placed on an inner surface 13a of a diaphragm 13 of a flexible external gear 3 in the following examples. The strain gauge unit 5 may be mounted at a different location. The basic configuration of the torque detection device 10 is the same as a common resistance wire strain meter that uses strain gauges. Therefore, only the shape and position of the strain gauge unit 5 will be described hereinafter.

(Embodiment 1)

Figure 3A:
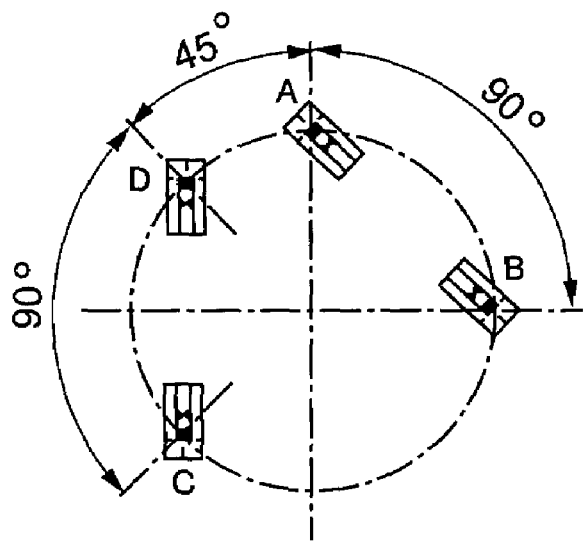
FIGS. 3A and 3B are respectively a diagram showing an example of a strain gauge arrangement that corresponds to the arrangement example shown in FIGS. 18A and 18B and configured using uniaxial strain gauge 2, and a diagram showing the bridge circuit thereof.
Figure 3B:
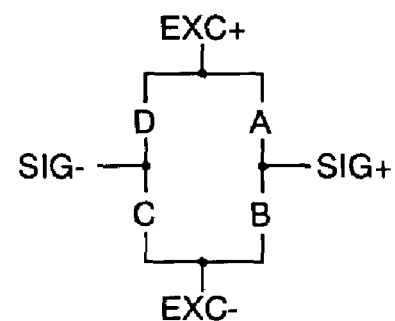
Figure 3C:
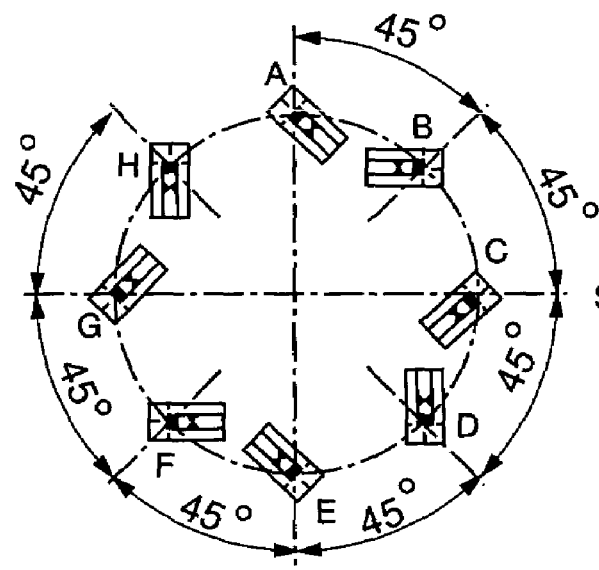
FIGS. 3C and 3D are respectively a diagram showing another example of a strain gauge arrangement that corresponds to the arrangement example shown in FIGS. 19A and 19B and configured using uniaxial strain gauges, and a diagram showing the bridge circuit thereof.
Figure 3D:
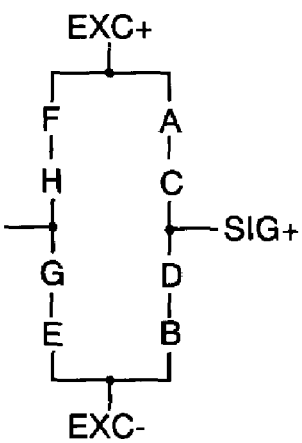
Figure 16A:
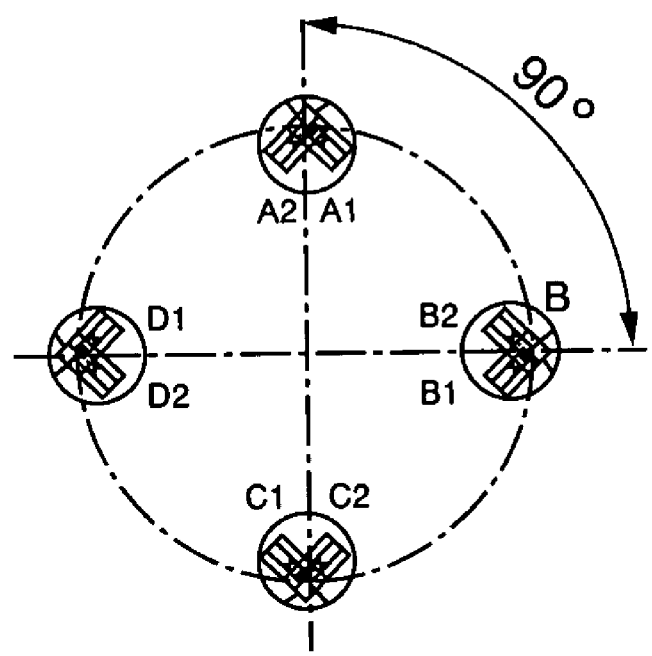
FIG. 16A is a diagram showing an arrangement example of perpendicular biaxial strain gauges mounted on the diaphragm of a flexible external gear in the torque detection device of a wave gearing.
Figure 16B:
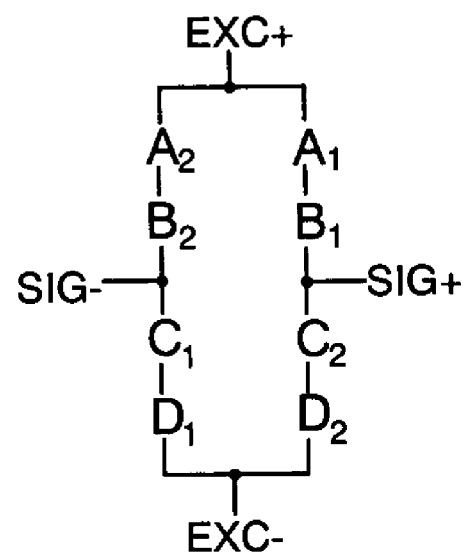
FIG. 16B is a diagram showing the bridge circuit thereof.
Figures 17A, 17B:
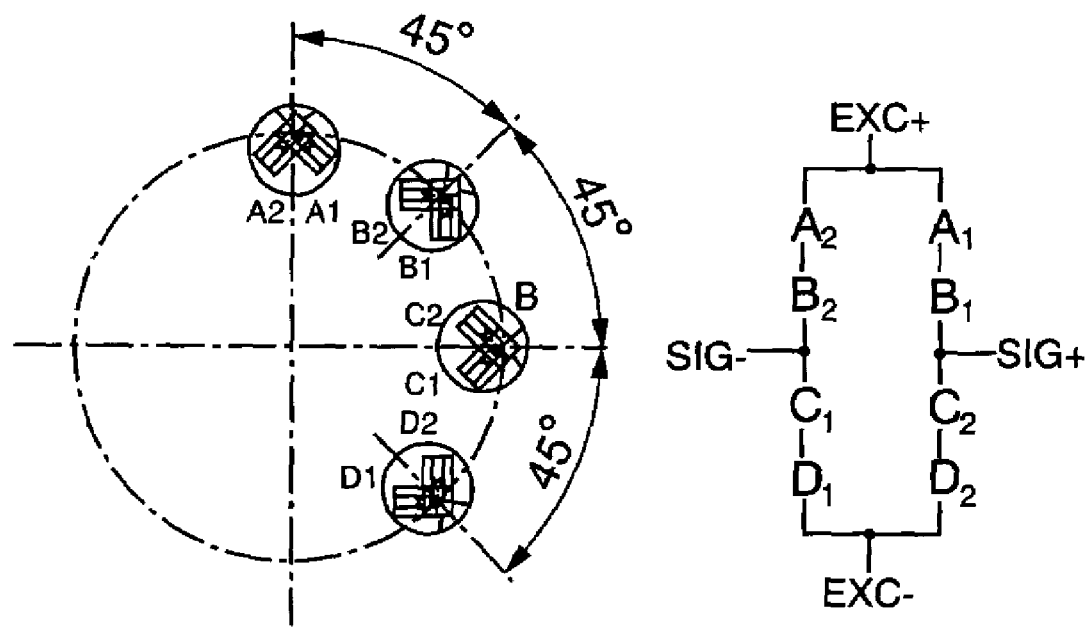
FIG. 17A is a diagram showing an arrangement example of perpendicular biaxial strain gauges mounted on the diaphragm of a flexible external gear in the torque detection device of a wave gearing.
FIG. 17B is a diagram showing the bridge circuit thereof.
Figure 18A:
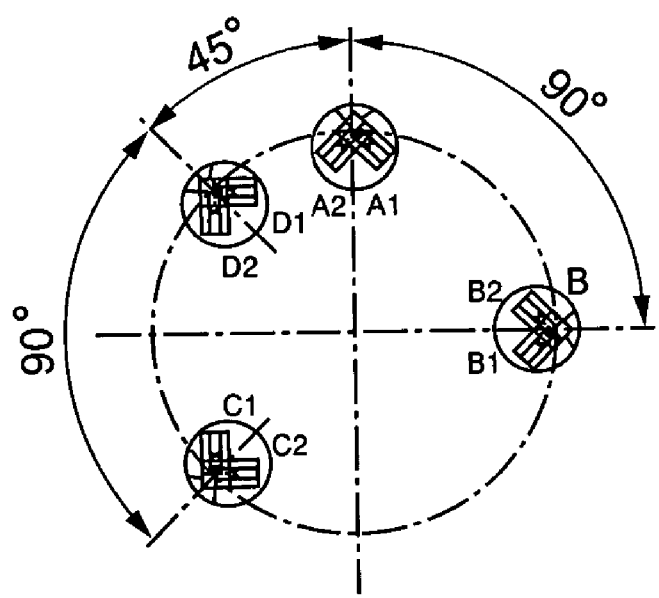
FIG. 18A is a diagram showing an arrangement example of perpendicular biaxial strain gauges mounted on the diaphragm of a flexible external gear in the torque detection device of a wave gearing.
Figure 18B:
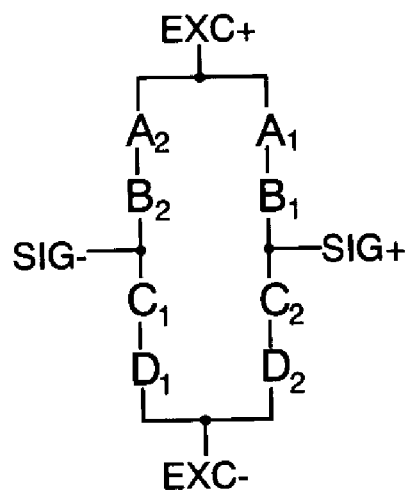
FIG. 18B is a diagram showing the bridge circuit thereof.
Figure 19A:
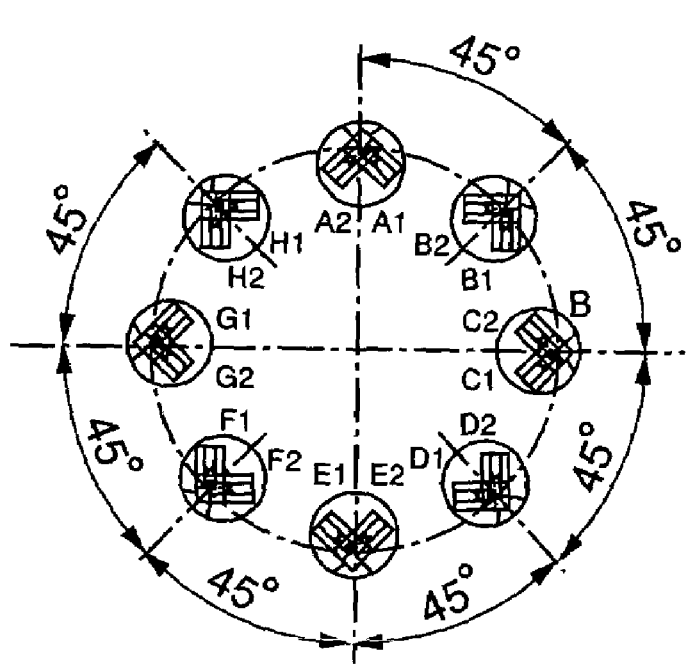
FIG. 19A is a diagram showing an arrangement example of perpendicular biaxial strain gauges mounted on the diaphragm of a flexible external gear in the torque detection device of a wave gearing.
Figure 19B:
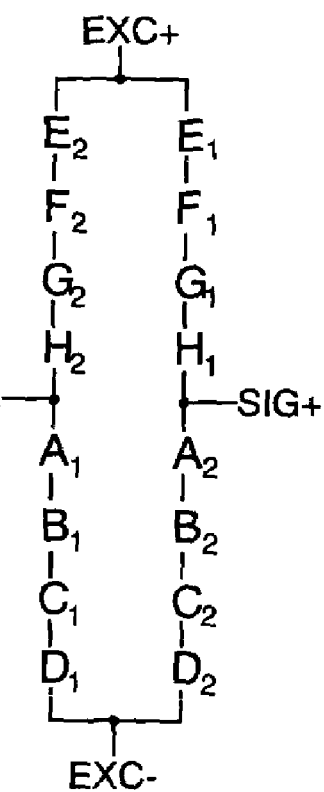
FIG. 19B is a diagram showing the bridge circuit thereof.

FIGS. 2A to 2F and FIGS. 3A to 3D each show examples of mounting positions in the case that uniaxial strain gauges are used as the strain gauge unit 5 mounted on the inner surface 13a of the diaphragm 13 (see FIG. 1) of the flexible external gear 3 of the wave gearing 1. FIGS. 2A and 2B correspond to FIGS. 16A and 16B. FIGS. 2C and 2D also show configurations that fundamentally correspond to FIGS. 16A and 16B, but these configurations are obtained by taking asymmetry into consideration in the sense that stretching, compression, flexing, and other types of strain along the minor and major axes in the elliptically flexing external gear 3 do not perfectly reach the same magnitude, and by adopting a reversed mounting arrangement in which the detection direction of strain gauges C and D is opposite that of strain gauges A and B. The composite signal of detected signals obtained from the bridge circuit 6 is expressed by (A+C)−(D+B) in the case of FIGS. 2A and 2B, but is (A−C)+(D−B) in FIGS. 2C and 2D. FIGS. 2E and 2F show configurations that correspond to FIGS. 17A and 17B, FIGS. 3A and 3B show configurations that correspond to FIGS. 18A and 18B, and FIGS. 3C and 3D show configurations that correspond to FIGS. 19A and 19B. In the case of FIGS. 3A and 3C as well, an arrangement that takes the above-described asymmetry into account and changes the direction of the strain gauges may be adopted.

When such uniaxial strain gauges A to H are used, the cost of strain gauges is low, and the number of lead wires drawn out from the strain gauges is also halved, so the torque detection device can be manufactured inexpensively, and the wiring of the strain gauge is simplified.

(Embodiment 2)

Although commercially available uniaxial strain gauges are used in the examples described above, it is possible to manufacture and use one or more strain gauge units having a specific strain gauge pattern. For example, in lieu of using four sets of perpendicular biaxial strain gauges such as those shown in FIG. 16A, it is possible to suggest a strain gauge unit having a strain gauge pattern in which four sets (A1, A2, B1, B2, C1, C2, D1, D2) of herringbone-shaped detection segments that correspond to perpendicular biaxial strain gauges, as shown in FIG. 4A. The strain gauge unit comprises a sheet 100 made from polyimide or the like, on which the detection segments and bridge wiring patterns are integrally formed as the strain gauge pattern. The strain gauge pattern can be formed, for example, by Cu—Ni material. The wiring operation is simplified by drawing out terminals (the portions indicated by the numbers 1 to 4 in the diagrams) for external connection from the bridge wiring patterns. Because the strain gauge pattern configured in this manner need only be mounted on the diaphragm 13 of the flexible external gear 3, there is no need to mount each strain gauge while positioning them one by one. Thus, manufacturing costs are also reduced because the mounting operation is simplified.

(Embodiment 3)

In the strain gauge pattern of embodiment 2 described above, it is difficult to increase the inner diameter and to reduce the outer diameter of the strain gauge unit 5 because each detection segment A1 to D2 is formed in the radial direction. In particular, it is necessary to reduce the outer diameter and to increase the inner diameter of the strain gauge unit when it is mounted on the diaphragm of a flexible external gear of a small-sized, hollow-type wave gearing.

In view of the above, the detection segments A to D of the strain gauge unit should be fashioned into a circular arc shape, and the grid pattern of the resistance wires that form the detection segments A to D should be formed at an inclination of 45° to the direction of the tangent line of the circular arc shape, as shown in FIGS. 5A and 5B, FIGS. 6A and 6B, FIGS. 7A and 7B, FIGS. 8A and 8B, FIGS. 9A and 9B, and FIGS. 10A and 10B. Such a configuration allows the inner diameter of the strain gauge pattern to be increased and the outer diameter thereof reduced because the width of the detection segments A to D can be reduced.

It is noted that, in these strain gauge patterns, the bridge wiring pattern is integrally formed for connecting the detection segments A to D and the terminals for external connection (portions indicated by the numbers 1 to 6) are also integrally formed. The strain gauge patterns can be formed directly on the surface of the flexible external gear by means of metal deposition or other methods, instead of forming on the surface of a plastic sheet. This can eliminate a step of mounting or adhering the sheet having the strain gauge pattern, enhancing the reliability of the strain gauge unit.

It is also noted that only the detection segments A to D and the terminals for external connection are substantially formed on the sheet in the examples of FIGS. 5A, 5B and FIGS. 6A, 6B. Such strain gauge patterns are extremely advantageous when the inner diameter of the strain gauge pattern should be increased, while the outer diameter thereof reduced. Thus, the strain gauge patterns of FIGS. 5A to 6B are preferable when the strain gauge unit is mounted on a surface of the flexible external gear of a small-sized, hollow-type wave gearing.

Figure 6A:
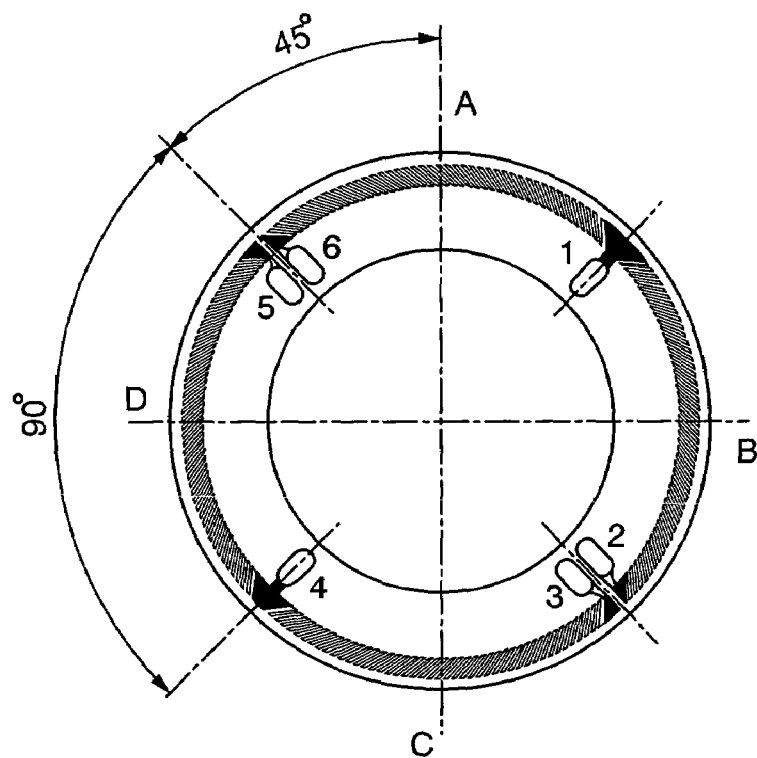
FIGS. 6A and 6B are respectively a diagram showing an example of the strain gauge pattern according to the third embodiment of the present invention, and a diagram showing the bridge circuit thereof.
Figure 6B:
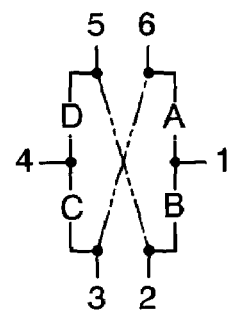

In addition, the strain gauge pattern of FIGS. 6A and 6B is capable of detecting torque more accurately than that of FIGS. 5A and 5B. More specifically, the strain gauge pattern of FIGS. 5A and 5B cannot eliminate detection error components due to asymmetrical, elliptical deformation of the flexible external gear. The pattern of FIGS. 7A and 7B is able to output signals excluding these error components so that an accurate torque detection can be performed. However, since the pattern of FIGS. 7A and 7B is formed integrally with wiring pattern, the size thereof tends to increase. Whereas, the strain gauge pattern of FIGS. 6A and 6B has the similar bridge connection as that of FIGS. 7A and 7B but has no wiring pattern, so that it is able to perform an accurate torque detection without either decrease in size of the inner diameter or increase of the outer diameter of the pattern. Thus, the strain gauge pattern of FIGS. 6A and 6B is suitable for a small-sized, hollow-type wave gearing.

In addition, the strain gauge pattern of FIGS. 6A and 6B has a pair of detection segments A and B and a pair of detection segments C and D in a condition that these pairs are not wire-connected with each other on the surface of the sheet. Namely, wire connections are not formed between the external connection terminals 2 and 5 or between those 3 and 6. Thus, the resistance values of these detection segments can be measured after manufacturing process of the strain gauge unit, maintaining the quality thereof, which is advantageous.

Figure 8A:
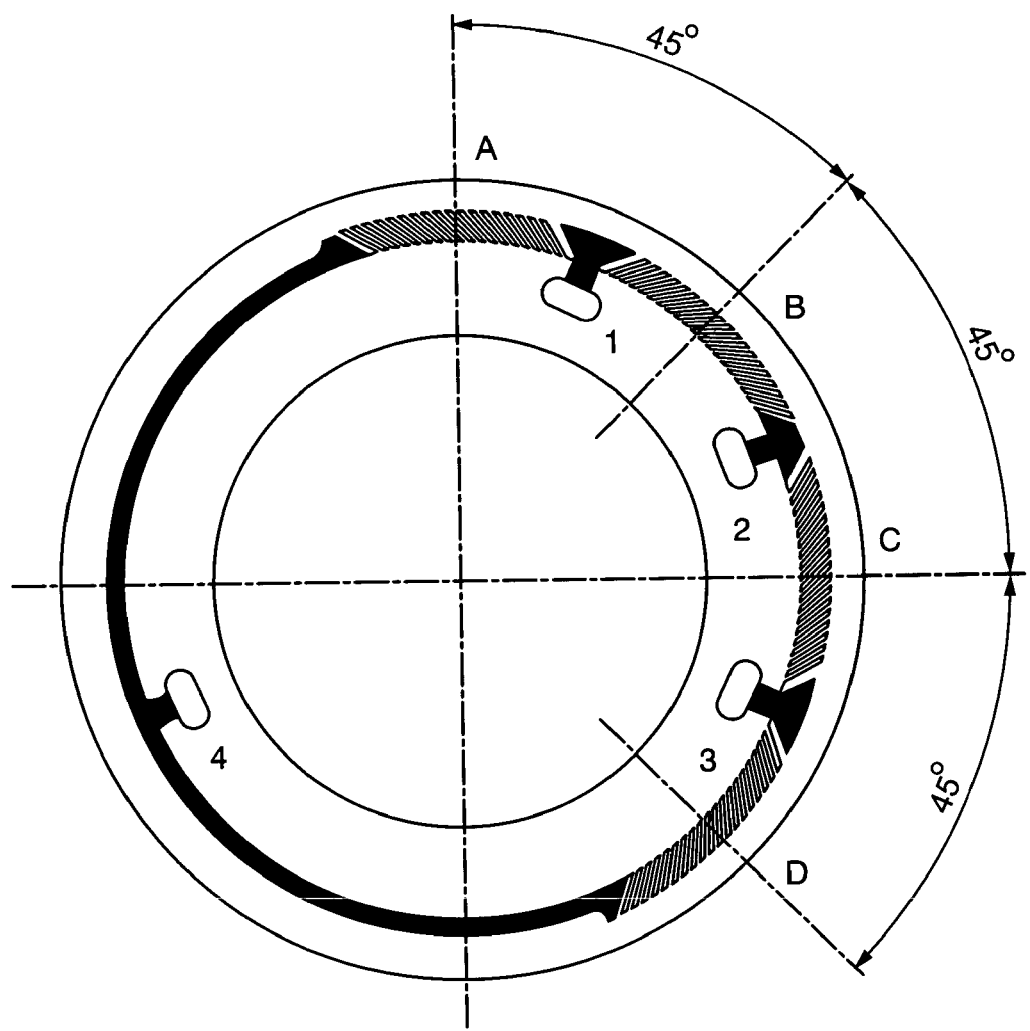
FIGS. 8A and 8B are respectively a diagram showing an example of the strain gauge pattern according to the third embodiment of the present invention, and a diagram showing the bridge circuit thereof.
Figure 8B:
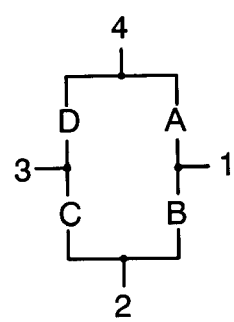

FIGS. 5A and 5B depict configurations that correspond to FIGS. 2A and 2B; FIGS. 6A and 6B, FIGS. 7A and 7B depict configurations that correspond to FIGS. 2C and 2D; FIGS. 8A and 8B depict configurations that correspond to FIGS. 2E and 2F; FIGS. 9A and 9B depict configurations that correspond to FIGS. 3A and 3B; and FIGS. 10A and 10B depict configurations that correspond to FIGS. 3C and 3D.

(Embodiment 4)

Next, a strain gauge pattern wherein a single detection segment is configured so as to encompass a range of 360° is shown in FIGS. 11A and 11B. The terminals (the portions indicated by the numbers 1 and 2 in the diagrams) for external wiring are also integrally formed at both ends thereof. When a strain gauge unit having a strain gauge pattern with such a configuration is mounted on the surface of the diaphragm 13 in the flexible external gear 3 of the wave gearing 1, the ripple component of the detected signal is averaged and ripples are effectively compensated because strain detection is allowed to encompass the entire 360°. Thus, the transmitted torque of the wave gearing 1 can be detected with high accuracy while using a very simple strain gauge pattern.

Figure 12A:
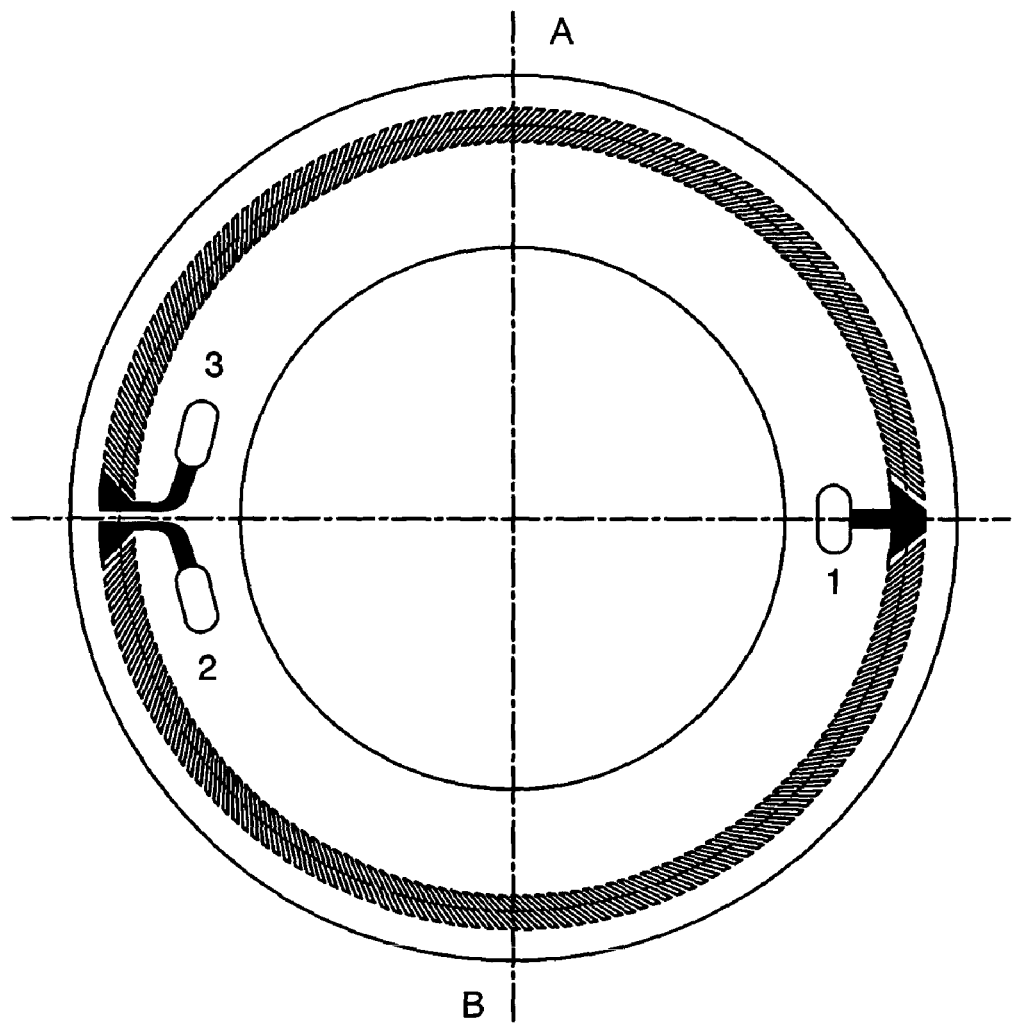
FIGS. 12A and 12B are respectively a diagram showing an example of the strain gauge pattern according to the fourth embodiment of the present invention, and a diagram showing the bridge circuit thereof.
Figure 12B:
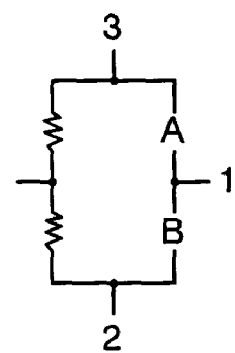

The flexing in the radial direction of the flexible external gear 3 has two periods, with a single period constituting 180°, for each rotation of the waver generator in the wave gearing 1, making it possible to use a strain gauge pattern with integrated detection segments A and B in the form of circular arcs that have an angle of 180°, as shown in FIGS. 12A and 12B. In this case, it is also possible to integrate the terminal (the portion indicated by the number 1 in the diagrams) for external connection drawn out from the connecting end of the detection segments A and B, and the terminals (the portions indicated by the numbers 3 and 2 in the diagrams) for external connection drawn out from the end of the detection segments A and B.

This configuration is superior to the strain gauge pattern of FIG. 11A with regard to temperature compensation because this is a half-bridge circuit configuration.

Figure 13:
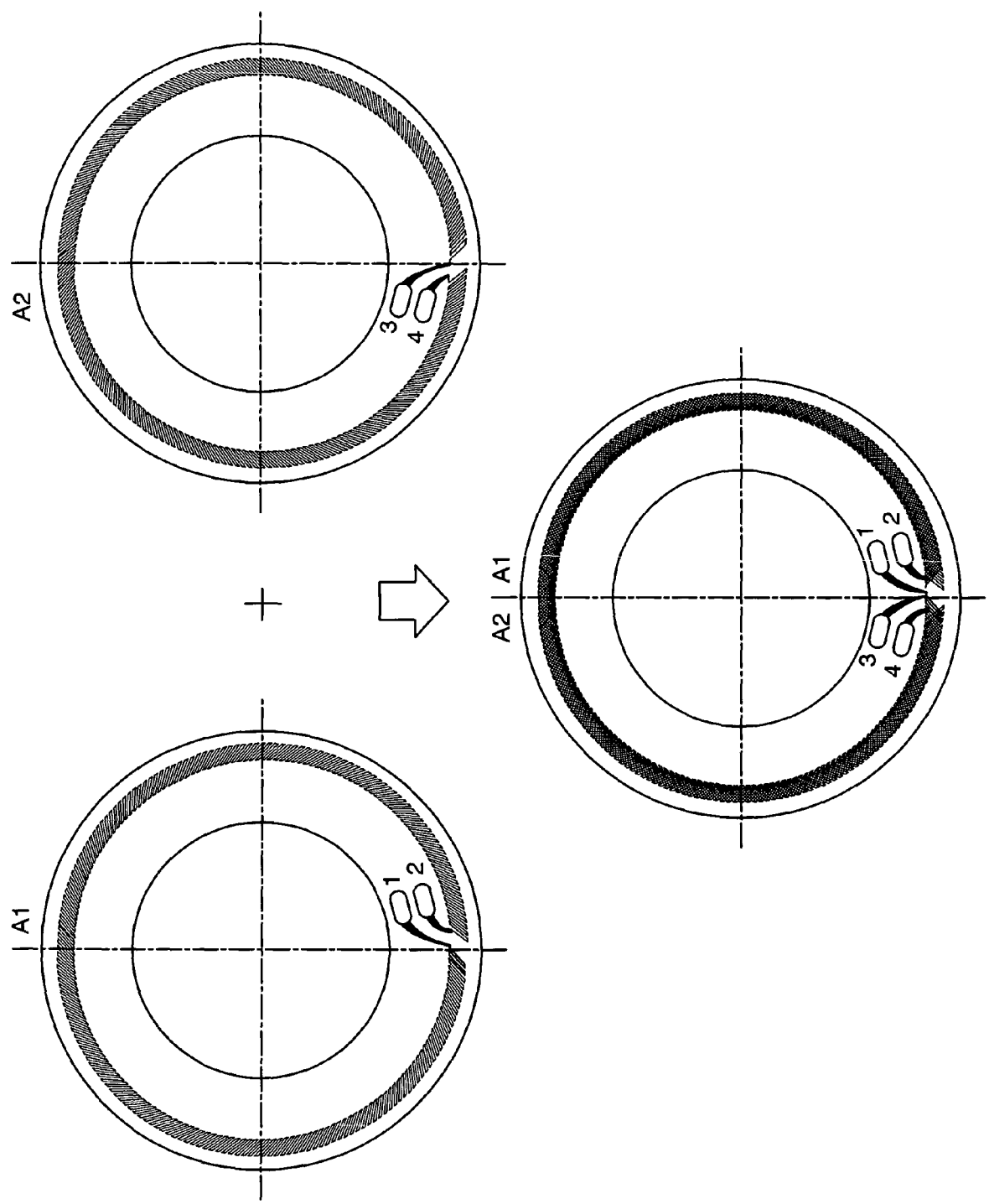
FIG. 13 is an explanatory view showing an example of the strain gauge pattern having a structure in which two strain gauges of Fig. are superposed.

FIG. 13 shows a strain gauge pattern that is a composite pattern of the two strain gauge patterns of FIG. 11 adhered together. One of the strain gauge patterns has a single detection segment A1 encompassing an angle range of 360 degrees and terminals for external connection (denoted by the numbers 1 and 2 in the drawing), and the other has a single detection segment A2 encompassing an angle range of 360 degrees and terminals for external connection (denoted by the numbers 3 and 4 in the drawing). These two strain gauge patters are put together so that the grid patterns of the resistance wires of the respective detection segments A1 and A2 intersect perpendicular with each other.

When the thus constituted composite strain gauge unit is mounted on the surface of the diaphragm 13 in the flexible external gear 3 of the wave gearing 1, the ripple component of the detected signal is averaged and ripples are effectively compensated because strain detection is allowed to encompass the entire 360°. Further, the grid patterns of the two strain gauge patterns are arranged perpendicularly with each other, so that temperature compensation of the strain gauge unit can also be made. Thus, the transmitted torque of the wave gearing 1 can be detected with extremely high accuracy.

(Example of Grid Pattern)

Figure 14A:
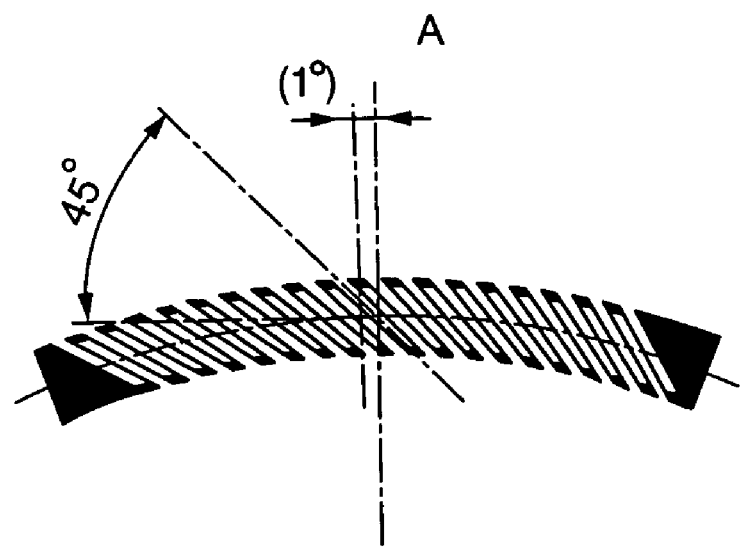
FIGS. 14A and 14B are enlarged views showing in enlarged form two examples of grid patterns of resistance wires constituting the detecting segments in the strain gauge patterns in FIGS. 5 to 13.
Figure 14B:
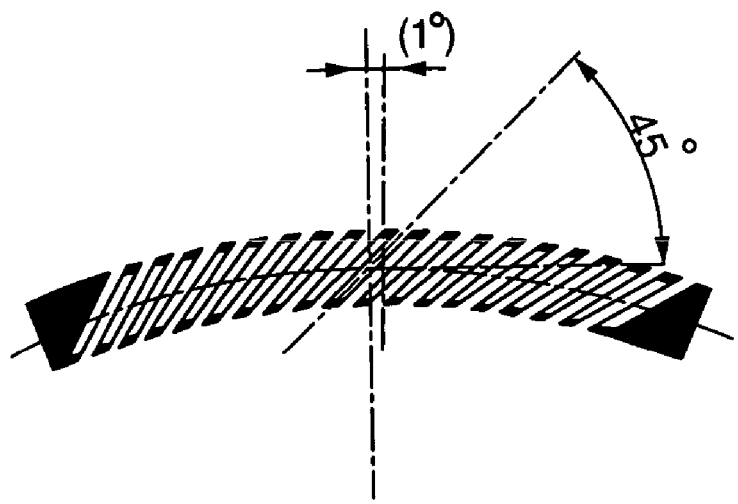

The example of the grid pattern of resistance wires constituting the detection segments A to D, A1, and A2 in FIGS. 5 to 13 are shown in enlarged form in FIGS. 14A and 14B.

According to the torque detection device for a wave gearing of the present invention as described above, a plurality of strain gauges mounted on a flexible external gear are formed as an integral strain gauge pattern in which the detection segments corresponding to the respective strain gauges take prescribed shapes, in particular, circular arc shapes. It is therefore possible to simplify operations in which numerous strain gauges are positioned and mounted on the diaphragm or other component of a flexible external gear. The positions between the detection segments are determined in advance, so mounting errors can also be reduced.

In the case that the detection segments are formed in circular arc shapes, the outer diameter of the strain gauge pattern can be reduced, making this approach applicable to cases in which the mounting space is narrow, such as small-sized wave gearing. Further, since the inner diameter of the strain gauge pattern can also be increased, the strain gauge pattern having the arc-shaped detection segments is particularly applicable to a small-sized, hollow-type wave gearing.

Further, according to the present invention, wiring operation of the strain gauge unit is also simplified, since the detection segments and the bridge wiring are integrally formed as the strain gauge pattern. In addition, using a strain gauge pattern whose detection segments are formed in circular arc shapes of 360° or 180° dispenses with the need to eliminate error components from detected signals on the basis of detected signals from a large number of detection segments, making it possible to realize an inexpensive torque detection device with a simple structure.

What is claimed is:

1. A torque detection device for a wave gearing, which device detects torque transmitted through a flexible external gear of the wave gearing, the device comprising:

a composite strain gauge unit mounted on a surface of the flexible external gear and having a first strain gauge unit formed with a first detection segment and a second strain gauge unit formed with a second detection segment, the first and second detection segments respectively have a circular arc shape of 360 degrees and are formed to have a grid pattern formed by portions of the resistance wire arranged at regular intervals, the grid pattern of the resistance wire for the first detection segment has portions arranged at equal intervals and along a direction inclined by 45 degrees with respect to a tangential direction of the circular arc shape, the grid pattern of the resistance wire for the second detection segment has portions arranged at equal intervals and along a direction inclined by 45 degrees with respect to a tangential direction of the circular arc shape, and the first and second stain gauge units are superposed together so that the first and second detection segments are arranged concentrically and that said portions of the respective grid patterns thereof face and intersect perpendicular with each other.

2. The torque detection device for a wave gearing according to claim 1, wherein the strain gauge pattern of the strain gauge unit includes a wiring pattern for connecting a plurality of the detection segments to each other so that the bridge circuit is constituted, and wherein the detection segments and the wiring pattern are integrally formed.

* * * * *